(12) United States Patent
Kidesaki

(10) Patent No.: US 10,994,574 B2
(45) Date of Patent: May 4, 2021

(54) PNEUMATIC TIRE

(71) Applicant: The Yokohama Rubber Co., LTD., Tokyo (JP)

(72) Inventor: Takashi Kidesaki, Hiratsuka (JP)

(73) Assignee: The Yokohama Rubber Co., LTD.

( * ) Notice: Subject to any disclaimer, the term of this patent is extended or adjusted under 35 U.S.C. 154(b) by 496 days.

(21) Appl. No.: 15/756,044

(22) PCT Filed: Feb. 8, 2016

(86) PCT No.: PCT/JP2016/053715
§ 371 (c)(1),
(2) Date: Feb. 27, 2018

(87) PCT Pub. No.: WO2017/038109
PCT Pub. Date: Mar. 9, 2017

(65) Prior Publication Data
US 2018/0257438 A1 Sep. 13, 2018

(30) Foreign Application Priority Data

Sep. 4, 2015 (JP) .............................. JP2015-174824

(51) Int. Cl.
*B60C 11/12* (2006.01)
*B60C 11/03* (2006.01)
*B60C 11/04* (2006.01)

(52) U.S. Cl.
CPC ...... *B60C 11/1236* (2013.01); *B60C 11/0304* (2013.01); *B60C 11/0306* (2013.01);
(Continued)

(58) Field of Classification Search
CPC ............. B60C 11/0304; B60C 11/1236; B60C 11/0306; B60C 11/04; B60C 11/12;
(Continued)

(56) References Cited

U.S. PATENT DOCUMENTS

2013/0112325 A1 5/2013 Mukai
2014/0283967 A1 9/2014 Inoue

FOREIGN PATENT DOCUMENTS

EP 2781374 A2 * 9/2014 ......... B60C 11/1236
JP H02-077306 3/1990
(Continued)

OTHER PUBLICATIONS

Machine translation of JP2007-176287 (no date).*
(Continued)

*Primary Examiner* — Steven D Maki
*Assistant Examiner* — Philip N Schwartz
(74) *Attorney, Agent, or Firm* — Thorpe North & Western

(57) ABSTRACT

A pneumatic tire comprises main grooves extending in the tire circumferential direction. Grooves in vehicle inner and outer side center land portions are all narrow grooves. Vehicle inner side center land portion narrow grooves open to a vehicle center main groove at a first end, open to a vehicle inner side main groove at a second end, and bend in a tire circumferential direction. The narrow grooves in the vehicle outer side center land portion comprise vehicle outer side center land portion outer narrow grooves that open to a vehicle outer side main groove at a first end and terminate within the vehicle outer side center land portion at a second end and vehicle outer side center land portion inner narrow grooves that open to the vehicle center main groove at a first end and terminate within the vehicle outer side center land portion at the second end.

12 Claims, 6 Drawing Sheets

(52) U.S. Cl.
CPC ......... *B60C 11/04* (2013.01); *B60C 2011/036* (2013.01); *B60C 2011/0341* (2013.01); *B60C 2011/0372* (2013.01)

(58) Field of Classification Search
CPC ........... B60C 11/1204; B60C 2011/036; B60C 2011/1209
See application file for complete search history.

(56) References Cited

FOREIGN PATENT DOCUMENTS

| | | | | | |
|---|---|---|---|---|---|
| JP | 07179104 | A | * | 7/1995 | ............. B60C 11/00 |
| JP | 2004-217120 | | | 8/2004 | |
| JP | 2007-176287 | | | 7/2007 | |
| JP | 2007176287 | A | * | 7/2007 | ......... B60C 11/1263 |
| JP | 2011-225020 | | | 11/2011 | |
| JP | 2013-100020 | | | 5/2013 | |
| JP | 2014-184828 | | | 10/2014 | |

OTHER PUBLICATIONS

Machine translation of JP07-179104 (no date).*
International Search Report for International Application No. PCT/JP2016/053715 dated Apr. 5, 2016, 4 pages, Japan.

* cited by examiner

| | CONVENTIONAL EXAMPLE | EXAMPLE 1 | EXAMPLE 2 | EXAMPLE 3 | EXAMPLE 4 |
|---|---|---|---|---|---|
| GROOVES OF LAND PORTION BETWEEN MAIN GROOVES | LUG GROOVE PRESENT | NARROW GROOVE ONLY | NARROW GROOVE ONLY | NARROW GROOVE ONLY | NARROW GROOVE ONLY |
| NARROW GROOVE OF VEHICLE INNER SIDE CENTER LAND PORTION | OPEN TO MAIN GROOVE | NOT OPEN | OPEN | OPEN | OPEN | OPEN |
| | BEND | NO | YES | YES | YES | YES |
| | IN TIRE LATERAL DIRECTION | NOT COMMUNICATING | NOT COMMUNICATING | COMMUNICATES | COMMUNICATES | COMMUNICATES |
| | INCLINATION ANGLE α1, α2 | - | 20° | 20° | 85° | 60° |
| NARROW GROOVE OF VEHICLE OUTER SIDE CENTER LAND PORTION | OPEN TO MAIN GROOVE | NOT OPEN | OPENS ONLY AT ONE END | OPENS ONLY AT ONE END | OPENS ONLY AT ONE END | OPENS ONLY AT ONE END |
| | ARRANGEMENT POSITION | ONE SIDE | ALTERNATELY DISPOSED | ALTERNATELY DISPOSED | ALTERNATELY DISPOSED | ALTERNATELY DISPOSED |
| | IN TIRE LATERAL DIRECTION | NOT COMMUNICATING | NOT COMMUNICATING | COMMUNICATES | COMMUNICATES | COMMUNICATES |
| | INCLINATION ANGLE β1, β2 | - | 20° | 20° | 20° | 20° |
| GROOVE AREA | MAIN GROOVE AREA RATIO S1 | 13% | 13% | 13% | 13% | 13% |
| | OTHER THAN MAIN GROOVE AREA RATIO S2 | 3% | 3% | 3% | 3% | 3% |
| DRY STEERING STABILITY | | 100 | 110 | 110 | 110 | 110 |
| WET PERFORMANCE | | 100 | 100 | 101 | 100 | 102 |
| WEAR RESISTANCE | | 100 | 102 | 104 | 104 | 104 |

FIG. 6A

| | | EXAMPLE 5 | EXAMPLE 6 | EXAMPLE 7 | EXAMPLE 8 |
|---|---|---|---|---|---|
| GROOVES OF LAND PORTION BETWEEN MAIN GROOVES | | NARROW GROOVE ONLY | NARROW GROOVE ONLY | NARROW GROOVE ONLY | NARROW GROOVE ONLY |
| NARROW GROOVE OF VEHICLE INNER SIDE CENTER LAND PORTION | OPEN TO MAIN GROOVE | OPEN | OPEN | OPEN | OPEN |
| | BEND | YES | YES | YES | YES |
| | IN TIRE LATERAL DIRECTION | COMMUNICATES | COMMUNICATES | COMMUNICATES | COMMUNICATES |
| | INCLINATION ANGLE $\alpha_1, \alpha_2$ | 60° | 60° | 60° | 60° |
| NARROW GROOVE OF VEHICLE OUTER SIDE CENTER LAND PORTION | OPEN TO MAIN GROOVE | OPENS ONLY AT ONE END | OPENS ONLY AT ONE END | OPENS ONLY AT ONE END | OPENS ONLY AT ONE END |
| | ARRANGEMENT POSITION | ALTERNATELY DISPOSED | ALTERNATELY DISPOSED | ALTERNATELY DISPOSED | ALTERNATELY DISPOSED |
| | IN TIRE LATERAL DIRECTION | COMMUNICATES | COMMUNICATES | COMMUNICATES | COMMUNICATES |
| | INCLINATION ANGLE $\beta_1, \beta_2$ | 85° | 60° | 60° | 60° |
| GROOVE AREA | MAIN GROOVE AREA RATIO S1 | 13% | 13% | 22% | 18% |
| | OTHER THAN MAIN GROOVE AREA RATIO S2 | 3% | 3% | 12% | 8% |
| DRY STEERING STABILITY | | 110 | 110 | 110 | 110 |
| WET PERFORMANCE | | 102 | 103 | 105 | 103 |
| WEAR RESISTANCE | | 105 | 105 | 103 | 108 |

FIG. 6B

PNEUMATIC TIRE

TECHNICAL FIELD

The present technology relates to a pneumatic tire.

BACKGROUND ART

A pneumatic tire with a tread surface that includes grooves and narrow grooves that provides increased performance such as wear resistance is known in the related art. For example, the heavy duty radial tire described in Japanese Unexamined Patent Application Publication No. H02-77306 is designed to improve uneven wear resistance and heat build-up resistance and includes a tread surface including four main grooves extending in the circumferential direction, ribs located between the main grooves, and narrow grooves formed in the ribs that extend in the tire lateral direction.

Additionally, the pneumatic tire described in Japanese Unexamined Patent Application Publication No. 2011-225020 is designed to suppress heel and toe wear and includes a plurality of lug grooves extending in the tire lateral direction, a plurality of main grooves, block land portions defined by the plurality of lug grooves and the plurality of main grooves, and narrow grooves formed in the block land portions that open to the main grooves at both ends in the tire lateral direction of the block land portion and oscillate in the tire circumferential direction. Furthermore, the pneumatic tire described in Japanese Unexamined Patent Application Publication No. 2014-184828 is designed to improve steering stability and ride comfort and includes three main grooves extending in the circumferential direction, a plurality of ribs defined by the main grooves, a narrow groove formed only in a rib formed between the main grooves, wherein the shape of the sipes is different between a rib on the inner side in the vehicle width direction of the equatorial plane in the tire lateral direction and a rib on the outer side.

Grooves formed in a tread surface contribute greatly to drainage properties. A tread surface with too few grooves has low drainage properties, and thus low wet properties, i.e., running properties on wet road surfaces. Wet performance can be ensured by providing the tread surface with more grooves such as lug grooves and the like to increase the groove area ratio of the ground contact region of the tread surface. However, increasing the groove area ratio may result in a decrease in rigidity of the land portion. A decrease in rigidity of the land portion can cause a decrease in steering stability and wear resistance. This makes providing good wet performance, steering stability, and wear resistance in a compatible manner a great challenge.

SUMMARY

The present technology provides a pneumatic tire that can provide good steering stability, wear resistance, and wet performance in a compatible manner.

A pneumatic tire according to an embodiment of the present technology is a pneumatic tire with a designated mounting direction with respect to a vehicle, the pneumatic tire comprising:
a tread portion comprising
a vehicle center main groove extending in a tire circumferential direction,
a vehicle inner side main groove provided inward of the vehicle center main groove in a vehicle width direction,
a vehicle outer side main groove provided outward of the vehicle center main groove in the vehicle width direction, and
a plurality of land portions separated by the main grooves;
the tread portion comprising
a vehicle inner side center land portion disposed between the vehicle center main groove and the vehicle inner side main groove,
a vehicle outer side center land portion disposed between the vehicle center main groove and the vehicle outer side main groove,
a vehicle inner side shoulder land portion disposed inward of the vehicle inner side main groove in the vehicle width direction, and
a vehicle outer side shoulder land portion disposed outward of the vehicle outer side main groove in the vehicle width direction;
the vehicle inner side center land portion and the vehicle outer side center land portion comprise narrow grooves, the narrow grooves being the only grooves formed in the vehicle inner side center land portion and the vehicle outer side center land portion;
the narrow grooves in the vehicle inner side center land portion comprise vehicle inner side center land portion narrow grooves that open to the vehicle center main groove at a first end, open to the vehicle inner side main groove at a second end, and bend in the tire circumferential direction;
the narrow grooves in the vehicle outer side center land portion comprise vehicle outer side center land portion outer narrow grooves that open to the vehicle outer side main groove at a first end and terminate within the vehicle outer side center land portion at a second end, and vehicle outer side center land portion inner narrow grooves that open to the vehicle center main groove at a first end and terminate within the vehicle outer side center land portion at a second end; and
the vehicle outer side center land portion outer narrow grooves and the vehicle outer side center land portion inner narrow grooves are alternately disposed in the tire circumferential direction.

The pneumatic tire described above preferably has a configuration wherein
the vehicle outer side shoulder land portion comprises vehicle outer side shoulder land portion narrow grooves that open to the vehicle outer side main groove at a first end;
the vehicle inner side shoulder land portion comprises vehicle inner side shoulder land portion narrow grooves that open to the vehicle inner side main groove at a first end;
the vehicle outer side center land portion outer narrow grooves communicate with the vehicle outer side shoulder land portion narrow grooves via the vehicle outer side main groove; and
the vehicle inner side center land portion narrow grooves communicate with the vehicle inner side shoulder land portion narrow grooves via the vehicle inner side main groove and communicate with the vehicle outer side center land portion inner narrow grooves via the vehicle center land portion.

The pneumatic tire described above preferably has a configuration wherein the vehicle inner side shoulder land portion narrow grooves, the vehicle outer side center land portion inner narrow grooves, and the vehicle inner side center land portion narrow grooves satisfy the relationship $\alpha 3 = \alpha 1 + \alpha 2$,
where $\alpha 1$ is an angle of the vehicle inner side shoulder land portion narrow grooves with respect to the tire circumferential direction, $\alpha 2$ is an angle of the vehicle outer side center land portion inner narrow grooves with respect to the tire circumferential direction, and α3 is a minor angle of a bend in the vehicle inner side center land portion narrow grooves.

The pneumatic tire described above preferably has a configuration wherein the angle α1 of the vehicle inner side shoulder land portion narrow grooves and the angle α2 of the vehicle outer side center land portion inner narrow grooves are equal.

The pneumatic tire described above preferably has a configuration wherein the vehicle inner side shoulder land portion narrow grooves are formed satisfying the range 50°≤α1≤80°; and the vehicle outer side center land portion inner narrow grooves are formed satisfying the range 50°≤α2≤80°.

The pneumatic tire described above preferably has a configuration wherein β1=β2, where β1 is an angle of the vehicle outer side shoulder land portion narrow grooves with respect to the tire circumferential direction and β2 is an angle of the vehicle outer side center land portion outer narrow grooves with respect to the tire circumferential direction.

The pneumatic tire described above preferably has a configuration wherein the vehicle outer side shoulder land portion narrow grooves and the vehicle outer side center land portion outer narrow grooves are formed satisfying the range 50°≤β1, β2≤80°.

The pneumatic tire described above preferably has a configuration wherein a groove area ratio S1 between the main grooves and a contact patch of the tread portion satisfies the range 15%≤S1≤20%, and a groove area ratio S2 between grooves other than the main grooves and the contact patch satisfies the range 5%≤S2≤10%.

A pneumatic tire according to an embodiment of the present technology can achieve the effects of provide good steering stability, wear resistance, and wet performance in a compatible manner.

BRIEF DESCRIPTION OF DRAWINGS

FIG. 6A is a table showing the results of performance tests of pneumatic tires according to embodiments.

FIG. 6B is a table showing the results of performance tests of pneumatic tires according to embodiments.

DETAILED DESCRIPTION

Pneumatic tires according to embodiments of the present technology are described in detail below with reference to the drawings. However, the present technology is not limited to these embodiments. Constituents of the following embodiments include elements that are essentially identical or that can be substituted or easily conceived by one skilled in the art.

Herein, "tire lateral direction" refers to a direction that is parallel with a rotation axis of a pneumatic tire. "Inward in the tire lateral direction" refers to the direction toward the tire equatorial plane in the tire lateral direction. "Outward in the tire lateral direction" refers to the direction opposite the direction toward the tire equatorial plane in the tire lateral direction. Furthermore, "tire radial direction" refers to the direction orthogonal to the tire rotation axis. "Inward in the tire radial direction" refers to the direction toward the tire rotation axis in the tire radial direction. "Outward in the tire radial direction" refers to the direction away from the tire rotation axis in the tire radial direction. "Tire circumferential direction" refers to the direction of rotation about the tire rotation axis.

Figure 1:
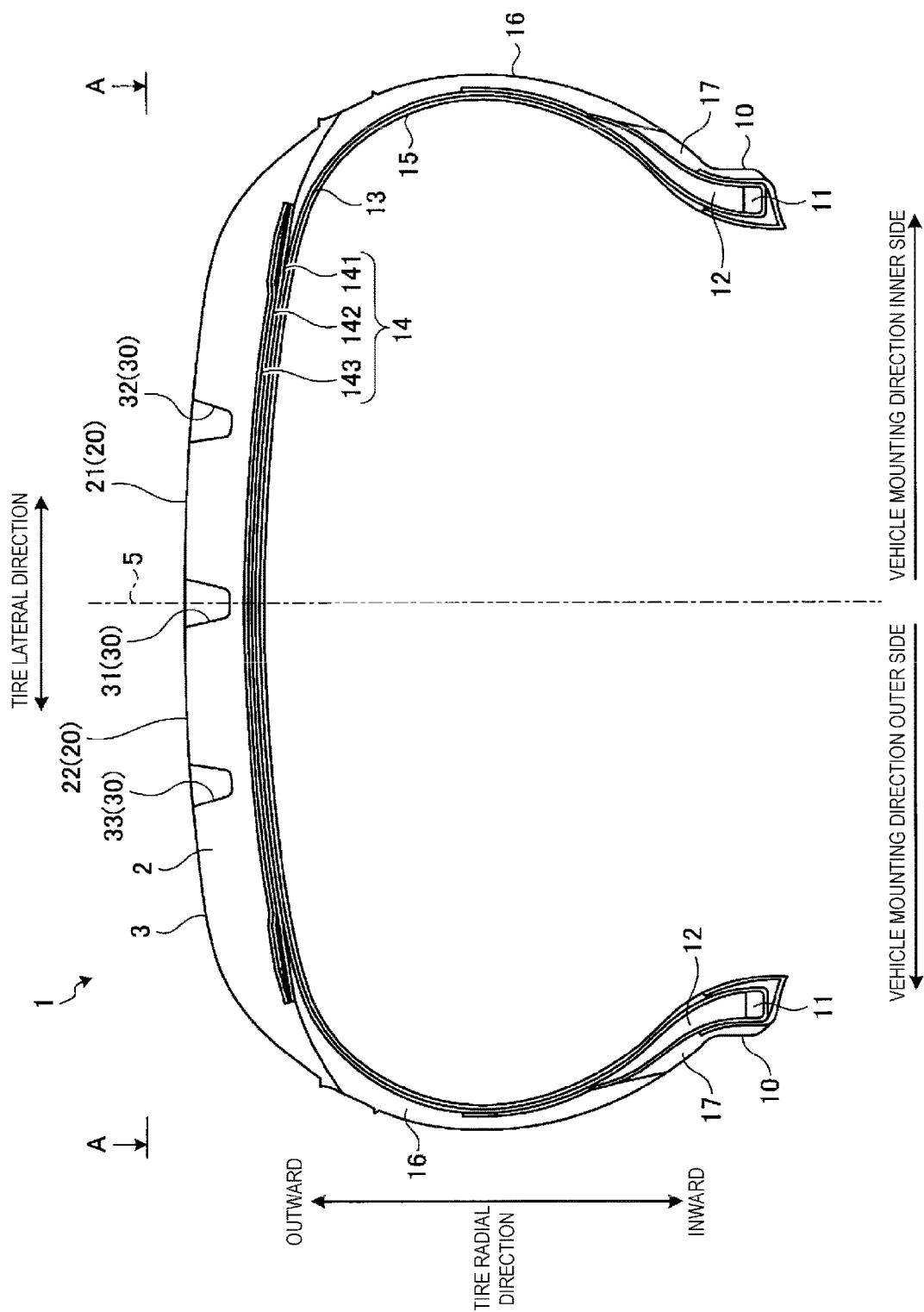
FIG. 1 is a meridian cross-sectional view illustrating a main portion of a pneumatic tire according to an embodiment.

FIG. 1 is a meridian cross-sectional view illustrating a main portion of a pneumatic tire according to an embodiment. For the pneumatic tire 1 illustrated in FIG. 1, a mounting direction with respect to a vehicle, i.e., a direction for when mounted, is designated. The pneumatic tire 1 includes a mounting direction indicator portion (not illustrated) that indicates the mounting direction with respect to a vehicle. The mounting direction indicator portion, for example, is constituted by a mark or grooves/ridges on the sidewall portion of the tire. For example, Economic Commission for Europe Regulation 30 (ECE R30) requires that a mounting direction indicator portion is provided on the sidewall portion on the outer side in the vehicle width direction when the tire is mounted on a vehicle. The pneumatic tire 1, as viewed in a meridian cross-section, is provided with a tread portion 2 in the outermost portion in the tire radial direction. The surface of the tread portion 2, i.e., the portion that comes into contact with the road surface when a vehicle (not illustrated) mounted with the pneumatic tire 1 travels, is formed as a tread surface 3. Additionally, sidewall portions 16 are provided from end portions of the tread portion 2 in the tire lateral direction to predetermined positions inward in the tire radial direction. In other words, the sidewall portions 16 are disposed at two positions on either side of the pneumatic tire 1 in the tire lateral direction.

Furthermore, a bead portion 10 is located inward of each sidewall portion 16 in the tire radial direction. The bead portions 10 are disposed at two positions on either side of a tire equatorial plane 5 in a similar manner to that of the sidewall portions 16. The bead portion 10 is provided with a bead core 11, and a bead filler 12 is provided outward of the bead core 11 in the tire radial direction.

A plurality of belt layers 14 is provided inward of the tread portion 2 in the tire radial direction. The belt layers 14 include a plurality of cross belts 141, 142 and a belt cover 143 and form a multilayer structure. The cross belts 141, 142 are made by a process of covering a plurality of belt cords made of steel or an organic fiber material with a coating rubber and then a rolling process. The cross belts 141, 142 have a belt angle, as an absolute value, ranging from 20° to 55°. Furthermore, the belt cords of the cross belts 141, 142 differ in that the set inclination angle of the fiber direction of the belt cords with respect to the tire circumferential direction differs, and the belts are layered so that the fiber directions of the belt cords intersect each other, i.e., a crossply structure. The belt cover 143 is constituted by a plurality of cords formed from steel or an organic fiber material covered by coating rubber and subjected to a rolling process. The belt cover 143 has a belt angle, as an absolute value, ranging from 0° to 10°. The belt cover 143 is disposed in a layered manner outward of the cross belts 141, 142 in the tire radial direction.

A carcass layer 13 is continuously provided inward of the belt layers 14 in the tire radial direction and on the side of the sidewall portions 16 proximal to the tire equatorial plane 5. The carcass layer 13 is a radial ply including textile cords. The carcass layer 13 has a single layer structure made of one carcass ply or a multilayer structure made of a plurality of carcass plies, and extends between the bead cores 11 on either side in the tire lateral direction in a toroidal shape, forming the framework of the tire. Specifically, the carcass layer 13 is disposed from one bead portion 10 to the other bead portion 10 located on either side in the tire lateral direction, and turns back outward in the tire lateral direction along the bead portions 10 and the bead cores 11, wrapping around the bead cores 11 and the bead fillers 12. The carcass ply (plies) of the carcass layer 13 is made by a process of covering a plurality of carcass cords made of steel or an organic fiber material, such as aramid, nylon, polyester, rayon, and the like, with a coating rubber and then a rolling process. The carcass ply (plies) has a carcass angle, i.e., an inclination angle of the fiber direction of the carcass cords with respect to the tire circumferential direction, as an absolute value, ranging from 80° to 95°.

A rim cushion rubber 17 is disposed radially inward and laterally outward of the bead core 11 and turned back portion of the carcass layer 13 at the bead portion 10. The rim cushion rubber 17 is the contact surface of the bead portion 10 against the rim flange. Additionally, an innerliner 15 is formed along the carcass layer 13 on the inner side of the carcass layer 13 or on the interior side of the pneumatic tire 1 of the carcass layer 13.

Figure 2:
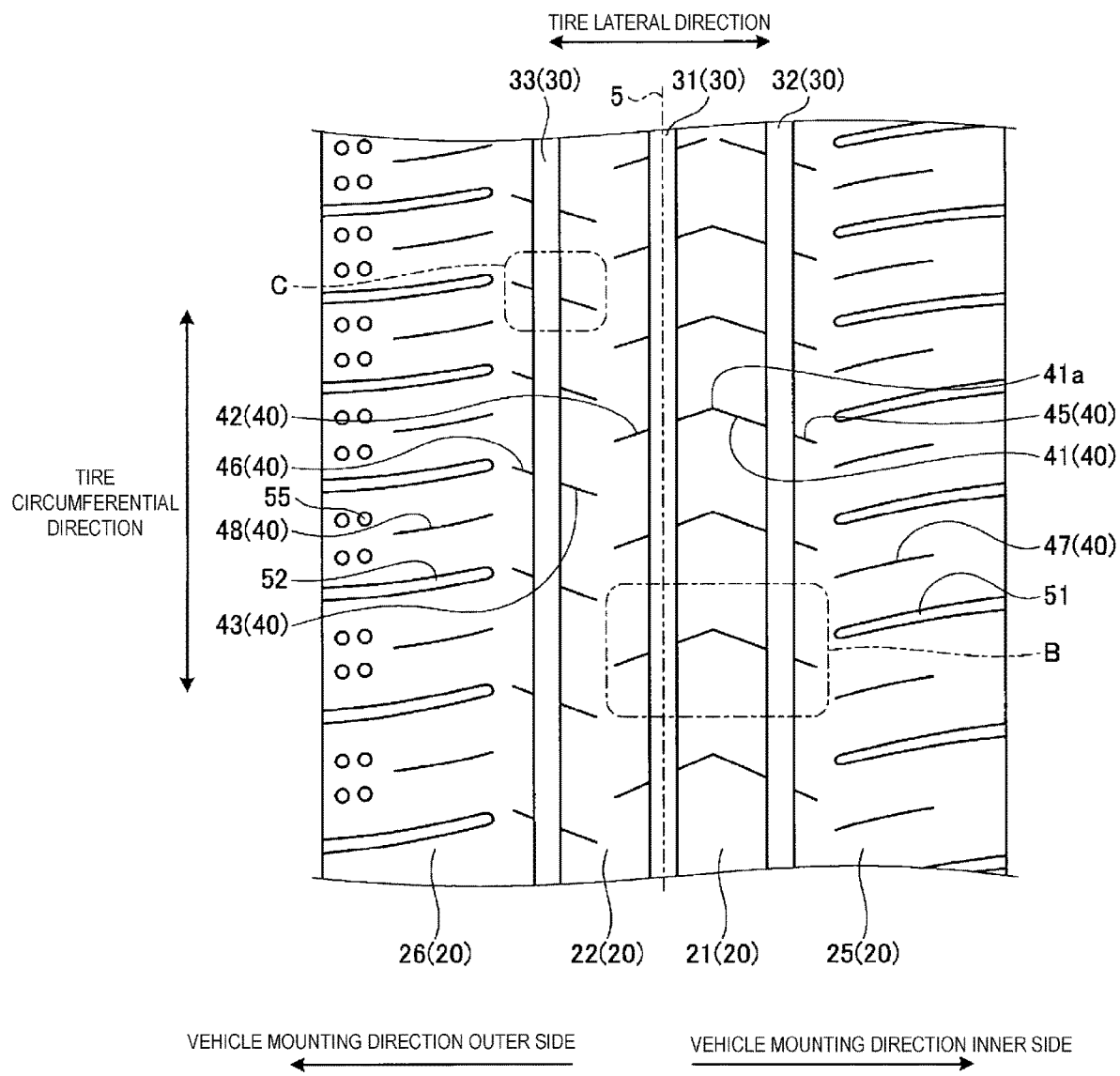
FIG. 2 is a view taken along line A-A of FIG. 1 in the direction of the arrows.

FIG. 2 is a view taken along line A-A in FIG. 1. In the tread surface 3 of the tread portion 2, three main grooves 30 extending in the tire circumferential direction are formed. In the tread surface 3, a plurality of land portions 20 are defined by the main grooves 30. Specifically, the pneumatic tire 1 according to the present embodiment has a designated orientation in the tire lateral direction when being mounted on a vehicle. Accordingly, the three main grooves 30 include a vehicle inner side main groove 32 located closest to the vehicle inner side in the vehicle width direction when the tire is mounted on a vehicle, a vehicle outer side main groove 33 located closest to the vehicle outer side in the vehicle width direction, and a vehicle center main groove 31 located between the vehicle inner side main groove 32 and the vehicle outer side main groove 33. The vehicle center main groove 31 is centrally located in the tire lateral direction and is formed on the tire equatorial plane 5.

Additionally, the tread portion 2 includes the land portions 20 separated by the main grooves 30. The land portions 20 include land portions 20 located between main grooves 30 and land portions 20 located outward of the main grooves 30 in the tire lateral direction. The land portions 20 located between main grooves 30 include a vehicle inner side center land portion 21 provided between the vehicle center main groove 31 and the vehicle inner side main groove 32 located on the inner side in the vehicle width direction when the tire is mounted on the vehicle. The land portions 20 located between main grooves 30 include a vehicle outer side center land portion 22 provided between the vehicle center main groove 31 and the vehicle outer side main groove 33 located on the outer side in the vehicle width direction when the tire is mounted on the vehicle. Furthermore, the land portions 20 located outward of the three main grooves 30 in the tire lateral direction include a vehicle inner side shoulder land portion 25 provided inward of the vehicle inner side main groove 32 in the vehicle width direction, and a vehicle outer side shoulder land portion 26 provided outward of the vehicle outer side main groove 33 in the vehicle width direction.

The only grooves formed in the vehicle inner side center land portion 21 and the vehicle outer side center land portion 22 are narrow grooves 40. In other words, no lug grooves 50 are formed in the vehicle inner side center land portion 21 and the vehicle outer side center land portion 22, and the grooves formed therein are all the narrow grooves 40. In the vehicle inner side shoulder land portion 25 and the vehicle outer side shoulder land portion 26, both the narrow grooves 40 and the lug grooves 50 are formed. In the present embodiment, the narrow grooves 40 have a groove width ranging from 0.1 mm to 1.0 mm and a groove depth ranging from 1.0 mm to 8.0 mm. The lug grooves 50 have a groove width ranging from 1.0 mm to 4.0 mm and a groove depth ranging from 1.0 mm to 8.0 mm. The main grooves 30 extend in the circumferential direction, have a groove width ranging from 4.0 mm to 8.0 mm, and a groove depth ranging from 1.0 mm to 8.0 mm. Circumferential narrow grooves, though not provided in the present embodiment, extend in the circumferential direction, have a groove width ranging from 0.1 mm to 1.0 mm, and a groove depth ranging from 1.0 mm to 8.0 mm.

In the vehicle inner side center land portion 21, a vehicle inner side center land portion narrow groove 41, which is a narrow groove 40, is formed. A plurality of the vehicle inner side center land portion narrow grooves 41 are formed in the vehicle inner side center land portion 21. The vehicle inner side center land portion narrow groove 41 bends in the tire circumferential direction and opens to the vehicle center main groove 31 at one end and opens to the vehicle inner side main groove 32 at the other end. Specifically, the vehicle inner side center land portion narrow groove 41 is formed extending between the vehicle center main groove 31 and the vehicle inner side main groove 32. The vehicle inner side center land portion narrow groove 41 is inclined in the tire circumferential direction with respect to the tire lateral direction, and the direction of incline toward the tire circumferential direction changes at a predetermined position in the tire lateral direction. For example, the vehicle inner side center land portion narrow groove 41 changes its direction of incline toward the tire circumferential direction with respect to the tire lateral direction at a position in the central region of the vehicle inner side center land portion 21 in the tire lateral direction. The portion where the vehicle inner side center land portion narrow groove 41 changes its direction of incline toward the tire circumferential direction is a bent portion 41*a*. The bent portion 41*a* is bent in the tire circumferential direction. The bent portion 41*a* is preferably formed at a position 35% of the width of the vehicle inner side center land portion 21 in the tire lateral direction from the end portion of the vehicle inner side center land portion 21 proximal to the vehicle center main groove 31.

The vehicle outer side center land portion 22 includes, as the narrow grooves 40, a vehicle outer side center land portion outer narrow groove 43 and a vehicle outer side center land portion inner narrow groove 42. In other words, in the vehicle outer side center land portion 22 the vehicle outer side center land portion outer narrow groove 43 and the vehicle outer side center land portion inner narrow groove 42 are formed. The vehicle outer side center land portion outer narrow groove 43 is a narrow groove 40 that opens to the vehicle outer side main groove 33 at one end and terminates in the vehicle outer side center land portion 22 at the other end. The vehicle outer side center land portion inner narrow groove 42 is a narrow groove 40 that opens to the vehicle center main groove 31 at one end and terminates in the vehicle outer side center land portion 22 at the other end. The vehicle outer side center land portion outer narrow groove 43 and the vehicle outer side center land portion inner narrow groove 42 are alternately disposed in the tire circumferential direction in the vehicle outer side center land portion 22.

The vehicle outer side center land portion outer narrow groove 43 and the vehicle outer side center land portion inner narrow groove 42 are inclined in the tire circumferential direction with respect to the tire lateral direction. The direction of incline toward the tire circumferential direction of the vehicle outer side center land portion outer narrow groove 43 from the vehicle outer side main groove 33 toward the vehicle center main groove 31 is the same as the direction of incline toward the tire circumferential direction of the vehicle outer side center land portion inner narrow groove 42 from the vehicle center main groove 31 toward the vehicle outer side main groove 33.

Additionally, in the vehicle inner side shoulder land portion 25, a vehicle inner side shoulder land portion narrow groove 45 is formed. The vehicle inner side shoulder land portion narrow groove 45 is a narrow groove 40 that opens to the vehicle inner side main groove 32 at one end. The vehicle inner side center land portion narrow grooves 41 formed in the vehicle inner side center land portion 21 communicates with the vehicle inner side shoulder land portion narrow groove 45 via the vehicle inner side main groove 32.

Specifically, the vehicle inner side shoulder land portion narrow groove 45 is inclined toward the tire circumferential direction with respect to the tire lateral direction. Additionally, the vehicle inner side center land portion narrow groove 41 inclines in different directions toward the tire circumferential direction with respect to the tire lateral direction on either side of the bent portion 41a in the tire lateral direction. In the vehicle inner side center land portion narrow grooves 41 formed in this manner, the portion on the side of the bent portion 41a proximal to the vehicle inner side main groove 32 in the tire lateral direction has the same direction of incline toward the tire circumferential direction with respect to the tire lateral direction and inclination angle as the direction of incline and inclination angle of the vehicle inner side shoulder land portion narrow groove 45.

Furthermore, the vehicle inner side shoulder land portion narrow groove 45 is disposed on the extension line of the vehicle inner side center land portion narrow groove 41 inclined with respect to the tire lateral direction extended in the direction of the vehicle inner side shoulder land portion 25. In other words, the vehicle inner side shoulder land portion narrow groove 45 is disposed on the extension line of the portion of the vehicle inner side center land portion narrow groove 41 that opens to the vehicle inner side main groove 32 extended in the direction of the vehicle inner side shoulder land portion 25. Thus, the vehicle inner side center land portion narrow groove 41 and the vehicle inner side shoulder land portion narrow groove 45 communicate via the vehicle inner side main groove 32.

Additionally, the vehicle inner side center land portion narrow groove 41 communicates with the vehicle outer side center land portion inner narrow groove 42 via the vehicle center main groove 31. Specifically, the portion of the vehicle inner side center land portion narrow 41 on the side of the bent portion 41a proximal to the vehicle center main groove 31 in the tire lateral direction has the same direction of incline toward the tire circumferential direction with respect to the tire lateral direction and inclination angle as the direction of incline and inclination angle of the vehicle outer side center land portion inner narrow groove 42.

Furthermore, the vehicle outer side center land portion inner narrow groove 42 is disposed on the extension line of the vehicle inner side center land portion narrow groove 41 inclined with respect to the tire lateral direction extended in the direction of the vehicle outer side center land portion 22.

In other words, the vehicle outer side center land portion inner narrow groove 42 is disposed on the extension line of the portion of the vehicle inner side center land portion narrow groove 41 that opens to the vehicle center main groove 31 extended in the direction of the vehicle outer side center land portion 22. Thus, the vehicle inner side center land portion narrow groove 41 and the vehicle outer side center land portion inner narrow groove 42 communicate via the vehicle center main groove 31.

Figure 3:
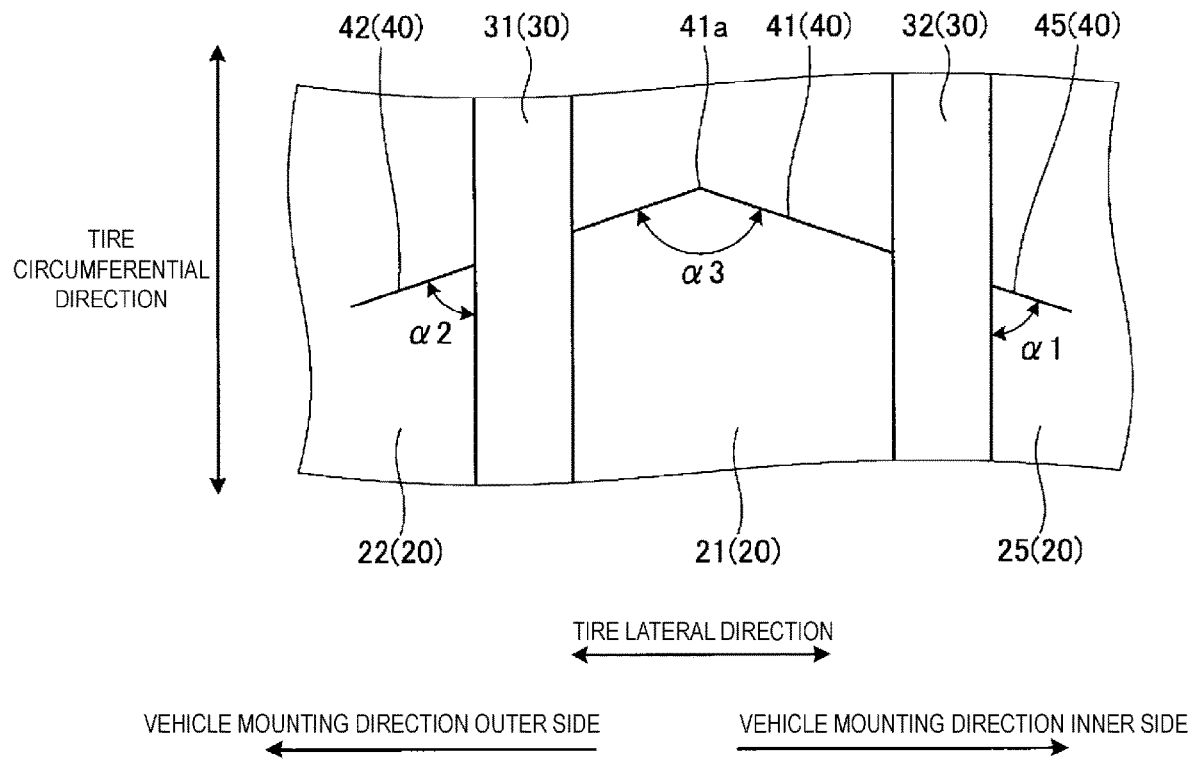
FIG. 3 is a detailed view of area B of FIG. 2.

FIG. 3 is a detailed view of area B of FIG. 2. The vehicle inner side shoulder land portion narrow groove 45, the vehicle outer side center land portion inner narrow groove 42, and the vehicle inner side center land portion narrow groove 41 are disposed such that the sum of the angle of the vehicle inner side shoulder land portion narrow groove 45 and the angle of the vehicle outer side center land portion inner narrow groove 42 with respect to the tire circumferential direction is the same as the angle of the bent portion 41a of the vehicle inner side center land portion narrow groove 41. In other words, the relationship $\alpha 3 = \alpha 1 + \alpha 2$ is satisfied, where $\alpha 1$ is the angle of the vehicle inner side shoulder land portion narrow groove 45 with respect to the tire circumferential direction, $\alpha 2$ is the angle of the vehicle outer side center land portion inner narrow groove 42 with respect to the tire circumferential direction, and $\alpha 3$ is the minor angle of the bent portion 41a of the vehicle inner side center land portion narrow groove 41.

Additionally, the angle $\alpha 1$ of the vehicle inner side shoulder land portion narrow groove 45 and the angle $\alpha 2$ of the vehicle outer side center land portion inner narrow groove 42 have the relationship $\alpha 1 = \alpha 2$, and the vehicle inner side shoulder land portion narrow groove 45 and vehicle outer side center land portion inner narrow groove 42 have the same inclination angle with respect to the tire circumferential direction, but incline is different directions. Furthermore, the angle with respect to the tire circumferential direction of the vehicle inner side shoulder land portion narrow groove 45 and the vehicle outer side center land portion inner narrow groove 42 ranges from 50° to 80°. In other words, the vehicle inner side shoulder land portion narrow groove 45 is formed satisfying the range $50° \leq \alpha 1 \leq 80°$, and the vehicle outer side center land portion inner narrow groove 42 is formed satisfying the range $50° \leq \alpha 2 \leq 80°$. Specifically, the vehicle inner side shoulder land portion narrow groove 45 and the vehicle outer side center land portion inner narrow groove 42 are formed with the same angle with respect to the tire circumferential direction for the inclination angle ranging from 50° to 80° and communicate with the vehicle inner side center land portion narrow groove 41 via the vehicle inner side main groove 32 and the vehicle center main groove 31.

Additionally, in the vehicle outer side shoulder land portion 26, a vehicle outer side shoulder land portion narrow groove 46 is formed. The vehicle outer side shoulder land portion narrow groove 46 is a narrow groove 40 that opens to the vehicle outer side main groove 33 at one end. The vehicle outer side center land portion outer narrow groove 43 formed in the vehicle outer side center land portion 22 communicates with the vehicle outer side shoulder land portion narrow groove 46 via the vehicle outer side main groove 33.

Specifically, the vehicle outer side shoulder land portion narrow groove 46 is inclined toward the tire circumferential direction with respect to the tire lateral direction and is inclined toward the tire circumferential direction with respect to the tire lateral direction in a similar manner to that of the vehicle outer side center land portion outer narrow groove 43. The vehicle outer side shoulder land portion narrow groove 46 and the vehicle outer side center land portion outer narrow groove 43 formed in this manner have the same direction of incline toward the tire circumferential direction with respect to the tire lateral direction and inclination angle.

Furthermore, the vehicle outer side shoulder land portion narrow groove 46 is disposed on the extension line of the vehicle outer side center land portion outer narrow groove 43 inclined with respect to the tire lateral direction extended in the direction of the vehicle outer side shoulder land portion 26. In other words, the vehicle outer side shoulder land portion narrow groove 46 is disposed on the extension line of the portion of the vehicle outer side center land portion outer narrow groove 43 that opens to the vehicle outer side main groove 33 extended in the direction of the vehicle outer side shoulder land portion 26. Thus, the vehicle outer side center land portion outer narrow groove 43 and the vehicle outer side shoulder land portion narrow groove 46 communicate via the vehicle outer side main groove 33.

Figure 4:
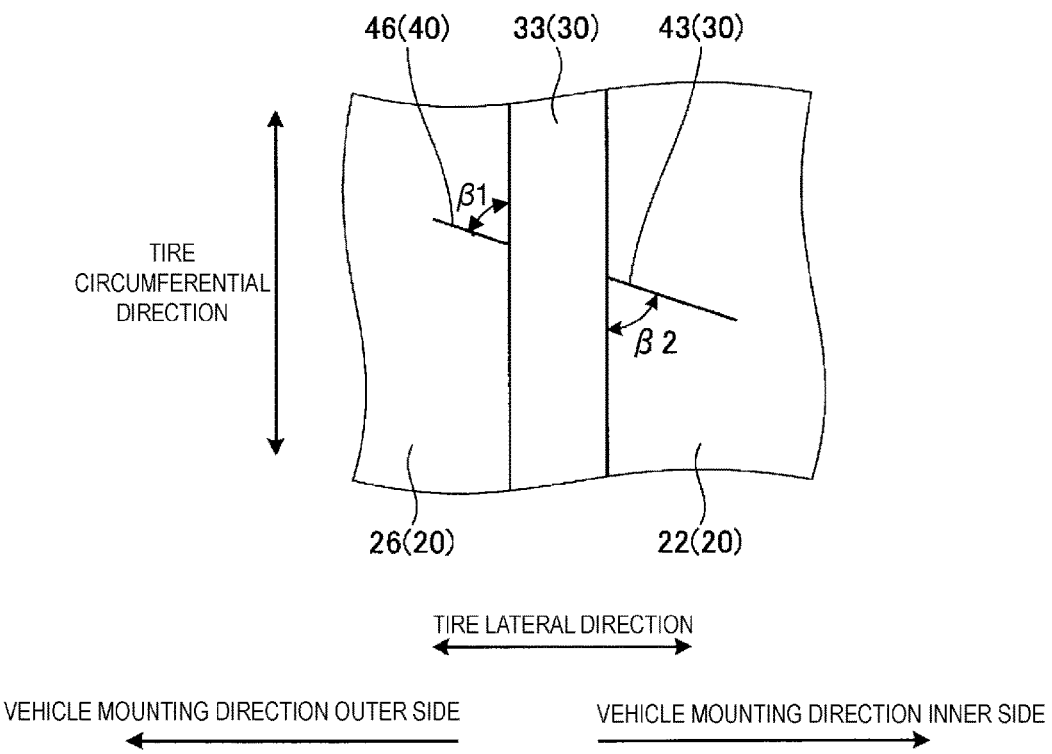
FIG. 4 is a detailed view of area C of FIG. 2.

FIG. 4 is a detailed view of area C of FIG. 2. Specifically, the vehicle outer side shoulder land portion narrow groove 46 and the vehicle outer side center land portion outer narrow groove 43 are disposed such that the relationship $\beta1=\beta2$ is satisfied, where $\beta1$ is the angle of the vehicle outer side shoulder land portion narrow groove 46 with respect to the tire circumferential direction, and $\beta2$ is the angle of the vehicle outer side center land portion outer narrow groove 43 with respect to the tire circumferential direction. Accordingly, the vehicle outer side shoulder land portion narrow groove 46 and the vehicle outer side center land portion outer narrow groove 43 have the same direction of incline toward the tire circumferential direction with respect to the tire lateral direction and inclination angle.

Furthermore, the angle with respect to the tire circumferential direction of the vehicle outer side shoulder land portion narrow groove 46 and the vehicle outer side center land portion outer narrow groove 43 ranges from 50° to 80°. In other words, the vehicle outer side shoulder land portion narrow groove 46 is formed satisfying the range $50°\leq\beta1\leq80°$, and the vehicle outer side center land portion outer narrow groove 43 is formed satisfying the range $50°\leq\beta2\leq80°$. Specifically, the vehicle outer side shoulder land portion narrow groove 46 and the vehicle outer side center land portion outer narrow groove 43 are formed with the same angle with respect to the tire circumferential direction for the inclination angle ranging from 50° to 80° and both communicate with the vehicle outer side main groove 33.

Additionally, in the vehicle inner side shoulder land portion 25, a vehicle inner side shoulder land portion inner narrow groove 47 is formed. The vehicle inner side shoulder land portion inner narrow groove 47 is a narrow groove 40 that terminates within the vehicle inner side shoulder land portion 25 at both ends. The vehicle inner side shoulder land portion inner narrow groove 47 is inclined in the tire circumferential direction with respect to the tire lateral direction in the direction opposite to the direction the vehicle inner side shoulder land portion narrow groove 45 is inclined in the tire circumferential direction with respect to the tire lateral direction. A plurality of the vehicle inner side shoulder land portion inner narrow grooves 47 are formed in a row in the tire circumferential direction in the vehicle inner side shoulder land portion 25. In the vehicle inner side shoulder land portion 25, a vehicle inner side shoulder land portion lug groove 51 is formed extending roughly in the tire lateral direction between pairs of the vehicle inner side shoulder land portion inner narrow grooves 47 adjacent in the tire circumferential direction. The vehicle inner side shoulder land portion lug groove 51 has a larger groove width than the narrow grooves 40 and a smaller groove width than the main grooves 30.

In a similar manner to that of the vehicle inner side shoulder land portion 25, in the vehicle outer side shoulder land portion 26, a vehicle outer side shoulder land portion inner narrow groove 48 is formed. The vehicle outer side shoulder land portion inner narrow groove 48 is a narrow groove 40 that terminates within the vehicle outer side shoulder land portion 26 at both ends. The vehicle outer side shoulder land portion inner narrow groove 48 is inclined in the tire circumferential direction with respect to the tire lateral direction in the direction opposite to the direction the vehicle outer side shoulder land portion narrow groove 46 is inclined in the tire circumferential direction with respect to the tire lateral direction. A plurality of the vehicle outer side shoulder land portion inner narrow groove 48 are formed in a row in the tire circumferential direction in the vehicle outer side shoulder land portion 26. In the vehicle outer side shoulder land portion 26, a vehicle outer side shoulder land portion lug groove 52 is formed between pairs of the vehicle outer side shoulder land portion inner narrow grooves 48 adjacent in the tire circumferential direction. Furthermore, in the vehicle outer side shoulder land portion 26, a plurality of recessed portions 55 with a substantially circular shape are formed in the outer end portion region in the vehicle width direction. A plurality of the recessed portions 55 are formed between pairs of the vehicle outer side shoulder land portion lug grooves 52 adjacent in the tire circumferential direction. The recessed portions 55 make the air turbulent when the wheel rotates. This suppresses separation of the air from the tire surface, and thus suppresses air resistance.

Figure 5:
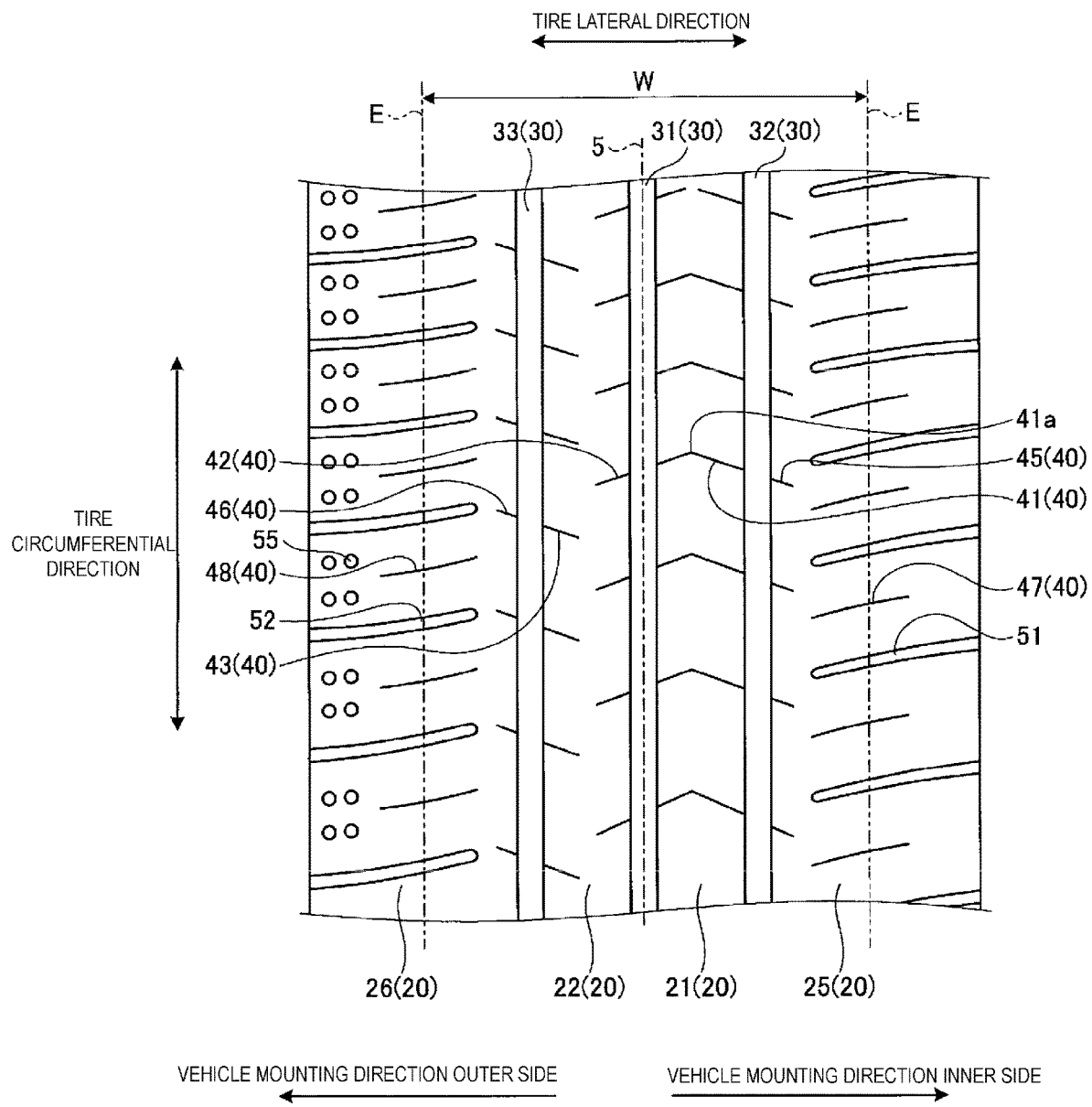
FIG. 5 is an explanatory diagram of a contact patch.

The pneumatic tire 1 according to the present embodiment is formed such that a groove area ratio S1 between the main grooves 30 and the contact patch of the tread portion 2 satisfies the range $15\%\leq S1\leq20\%$, and a groove area ratio S2 between the grooves other than the main grooves 30 and the contact patch satisfies the range $5\%\leq S2\leq10\%$. FIG. 5 is an explanatory diagram of the contact patch. The contact patch refers to the surface located in the region within the ground contact width W of the tread portion 2. In the pneumatic tire 1, the ranges $15\%\leq S1\leq20\%$ and $5\%\leq S2\leq10\%$ are satisfied, where S1 is the groove area ratio between the main grooves 30 formed in the tread surface 3 and the contact patch and S2 is the groove area ratio between the grooves other than the main grooves 30 formed in the tread surface 3 and the contact patch. The ground contact width W of this embodiment refers to the longest linear distance between ground contact edges E on either side in the tire lateral direction of the contact patch formed on a flat plate when the pneumatic tire 1 is mounted on a specified rim, inflated to the specified internal pressure, for example, internal conditions of 230 kPa, and vertically loaded on the flat plate with a load corresponding to 80% of the specified load.

Herein, "specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, and to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, and a "LOAD CAPACITY" defined by ETRTO.

When such a pneumatic tire 1 is mounted on a vehicle and the vehicle is driven, the pneumatic tire 1 rotates while the tread surface 3 of the tread surface 3 located at the bottom comes into contact with the road surface. Thus, when the vehicle is driving, the land portions 20 formed on the tread surface 3 successively come into contact with the road surface. In the tread surface 3, the three main grooves 30 are formed without lug grooves meeting the main grooves 30. In other words, the land portions 20 are not formed as blocks, but are all formed as ribs extending in the tire circumferential direction. This increases the rigidity of the land portions 20, making the land portions 20 less susceptible to deformation when the tread surface 3 comes into contact with the road surface. As a result, steering stability is increased. Also, by the rigidity of the land portions 20 being increased, uneven wear in the land portions 20 is suppressed.

In the vehicle inner side center land portion 21, the vehicle inner side center land portion narrow grooves 41 are formed. The vehicle inner side center land portion narrow grooves 41 bend in the tire circumferential direction and open to the vehicle center main groove 31 and the vehicle inner side main groove 32. In the vehicle outer side center land portion 22, the vehicle outer side center land portion inner narrow grooves 42 that open to the vehicle center main groove 31 and the vehicle outer side center land portion outer narrow groove 43 that open to the vehicle outer side main groove 33 are alternately formed in the tire circumferential direction. Accordingly, when the vehicle is driven on wet road surfaces, the water between the contact patch of the tread surface 3 and the road surface can be discharged by the narrow grooves 40 toward the main grooves 30. As a result, good steering stability, wear resistance, and wet performance can be provided in a compatible manner.

The narrow grooves 40 formed in the vehicle inner side center land portion 21 and the vehicle outer side center land portion 22 communicate with a counterpart narrow groove 40 formed in the adjacent land portion 20 on the other side of the main groove 30. As a result, when a stress is generated at or near the narrow grooves 40 in the land portions 20, the stress can be dispersed via the land portions 20 near the narrow groove 40 that communicates with the narrow groove 40 on the other side of the main groove 30. Thus, the stress concentration of the land portions 20 can be reduced, and wear resistance can be more reliably improved. The narrow grooves 40 formed in the land portions 20 on either side of the main groove 30 communicate with each other, lengthening the practical length of the narrow groove 40. Thus, the water between the tread surface 3 and the road surface can be more reliably discharged via the narrow grooves 40 toward the main grooves 30. As a result, the drainage capability of the narrow grooves 40 can be increased, and wet performance can be improved.

The angle α3 of the bent portion 41a of the vehicle inner side center land portion narrow groove 41 that bends in the tire circumferential direction is formed with the angle which is the sum of the angle α1 of the vehicle inner side shoulder land portion narrow groove 45 and the angle α2 of the vehicle outer side center land portion inner narrow groove 42 with respect to the tire circumferential direction. Accordingly, the vehicle inner side center land portion narrow groove 41, the vehicle inner side shoulder land portion narrow groove 45, and the vehicle outer side center land portion inner narrow groove 42 communicate in a linear manner. As a result, the water between the tread surface 3 and the road surface can be more reliably discharged via the narrow grooves 40 toward the main grooves 30, and wet performance can be more reliably improved.

The angle α1 of the vehicle inner side shoulder land portion narrow groove 45 and the angle α2 of the vehicle outer side center land portion inner narrow groove 42 are equal. Thus, the water at or near the vehicle inner side center land portion 21 can flow in the vehicle inner side main groove 32 and the vehicle center main groove 31 in an even manner. As a result, the water at or near the vehicle inner side center land portion 21 can be more reliably discharged, and wet performance can be more reliably improved.

The angle α1 of the vehicle inner side shoulder land portion narrow groove 45 and the angle α2 of the vehicle outer side center land portion inner narrow groove 42 are both 50° or greater. Thus, the shape of the opening regions of the vehicle inner side shoulder land portion narrow groove 45 and the vehicle outer side center land portion inner narrow groove 42 of the vehicle inner side shoulder land portion 25 and the vehicle outer side center land portion 22 to the main grooves 30 can be prevented from being too acute. As a result, the rigidity of the opening regions of the narrow grooves 40 to the main grooves 30 of the vehicle inner side shoulder land portion 25 and the vehicle outer side center land portion 22 can be ensured, and steering stability and wear resistance can be more reliably improved.

The angle α1 of the vehicle inner side shoulder land portion narrow groove 45 and the angle α2 of the vehicle outer side center land portion inner narrow groove 42 are both 80° or less. Thus, the vehicle inner side shoulder land portion narrow groove 45 and the vehicle outer side center land portion inner narrow groove 42 can be appropriately inclined with respect to the tire lateral direction, and the length of the narrow grooves 40 can be ensured. As a result, the water at or near the vehicle inner side shoulder land portion 25 and the vehicle outer side center land portion 22 can be more reliably discharged, and wet performance can be improved. Following from this, by the angle α1 of the vehicle inner side shoulder land portion narrow groove 45 and the angle α2 of the vehicle outer side center land portion inner narrow groove 42 satisfying the ranges $50° \le α1 \le 80°$ and $50° \le α2 \le 80°$, good steering stability, wear resistance, and wet performance can be more reliably provided in a compatible manner.

The angle β1 of the vehicle outer side shoulder land portion narrow groove 46 and the angle β2 of the vehicle outer side center land portion outer narrow groove 43 are equal. Thus, the vehicle outer side shoulder land portion narrow groove 46 and the vehicle outer side center land portion outer narrow groove 43 can be formed more reliably in a linear manner, and the vehicle outer side shoulder land portion narrow groove 46 and the vehicle outer side center land portion outer narrow groove 43 can more reliably communicate with each other. As a result, the water around the vehicle outer side main groove 33 can be more reliably discharged by the vehicle outer side shoulder land portion narrow groove 46 and the vehicle outer side center land portion outer narrow groove 43 toward the vehicle outer side main groove 33, and wet performance can be more reliably improved.

The angle β1 of the vehicle outer side shoulder land portion narrow groove 46 and the angle β2 of the vehicle outer side center land portion outer narrow groove 43 are both 50° or greater. Thus, the shape of the opening regions of the vehicle outer side shoulder land portion narrow groove 46 and the vehicle outer side center land portion outer narrow groove 43 of the vehicle outer side shoulder land portion 26 and the vehicle outer side center land portion 22 to the vehicle outer side main groove 33 can be prevented from being too acute. As a result, the rigidity of the opening regions of the narrow grooves 40 to the main grooves 30 of the vehicle outer side shoulder land portion 26 and the vehicle outer side center land portion 22 can be ensured, and steering stability and wear resistance can be more reliably improved.

The angle β1 of the vehicle outer side shoulder land portion narrow groove 46 and the angle β2 of the vehicle outer side center land portion outer narrow groove 43 are both 80° or less. Thus, the vehicle outer side shoulder land portion narrow groove 46 and the vehicle outer side center land portion outer narrow groove 43 can be appropriately inclined with respect to the tire lateral direction, and the length of the narrow grooves 40 can be ensured. As a result, the water at or near the vehicle outer side shoulder land portion 26 and the vehicle outer side center land portion 22 can be more reliably discharged, and wet performance can be improved. Following from this, by the angle β1 of the vehicle outer side shoulder land portion narrow groove 46 and the angle β2 of the vehicle outer side center land portion outer narrow groove 43 satisfying the range 50°≤β1, β2≤80°, steering stability and wear resistance can more reliably be improved without reducing wet performance.

The grooves are formed in the tread portion 2 such that the groove area ratio S1 between the main grooves 30 and the contact patch satisfies the range 15%≤S1≤20%, and the groove area ratio S2 between the grooves other than the main grooves 30 and the contact patch satisfies the range 5%≤S2≤10%. Thus, drainage properties can be maintained and the rigidity of the land portions 20 can be ensured. As a result, steering stability and wear resistance can more reliably be improved without reducing wet performance.

EXAMPLES

FIGS. 6A and 6B are tables showing the results of performance tests of pneumatic tires according to embodiments. In relation to the pneumatic tire 1 described above, performance evaluation tests conducted on a pneumatic tire 1 of a Conventional Example and pneumatic tires 1 according to embodiments of the present technology will be described below. The performance evaluation tests were for dry steering stability, i.e., steering stability on dry road surfaces, wet performance, i.e., driving performance on wet road surfaces, and wear resistance, i.e., resistance to wear when running.

In the performance evaluation tests, the pneumatic tires 1 having a size of 155/65R14•75S were mounted on rim wheels of a JATMA standard rim having a size of 14×4.5J, both front wheels and rear wheels were inflated to 240 kPa, and the tires were mounted on a light-class automobile used for the test runs. The evaluation method for each of the tests was are follows:

For dry steering stability, sensory evaluation of the parameters was performed, with the evaluation scores being converted to index values. Larger index values indicate superior dry steering stability. For wet performance, braking distance at a speed of 100 km/h was measured, with the braking distances being converted to index values. Larger index values indicate superior wet performance. For wear resistance, the vehicle was driven for 10000 km in a certain pattern. Thereafter, the amount of wear of the vehicle inner side center land portion 21, the vehicle outer side center land portion 22, the vehicle inner side shoulder land portion 25, and the vehicle outer side shoulder land portion 26 of the pneumatic tire 1 was measured to obtain an amount of wear. The amounts of wear were converted index values. Larger index values indicate superior wear resistance. Note that for the index values in the evaluation tests, the performance of the pneumatic tire 1 of the Conventional Example is assigned the index value of 100.

The pneumatic tire 1 used in the evaluation tests includes the three main grooves 30, the vehicle inner side center land portion 21 and the vehicle outer side center land portion 22 formed between the main grooves 30, and the narrow grooves 40 formed in the vehicle inner side center land portion 21 and the vehicle outer side center land portion 22. In the pneumatic tire 1 of the Conventional Example, lug grooves are formed in the land portions 20 between the main grooves 30, the narrow grooves 40 of the vehicle inner side center land portion 21 and the narrow grooves 40 of the vehicle outer side center land portion 22 both do not open to the main grooves 30, the narrow grooves 40 of the vehicle inner side center land portion 21 do not bend, and the narrow grooves 40 of the vehicle outer side center land portion 22 are only disposed on one side in the tire lateral direction.

In the pneumatic tires 1 of Examples 1 to 8, which are embodiments of the present technology, only the narrow grooves 40 are formed in the land portions 20 between the main grooves 30, and the narrow grooves 40 of the vehicle inner side center land portion 21 open to the main groove 30 and bend in the tire circumferential direction. Additionally, the narrow grooves 40 of the vehicle outer side center land portion 22 open to the main grooves 30 at a first end, and are alternately disposed at position in the tire circumferential direction on both end sides of the vehicle outer side center land portion 22 in the tire lateral direction. Furthermore, the pneumatic tires 1 according to Examples 1 to 8 differ in whether the narrow grooves 40 communicate via the main grooves 30, in the inclination angles α1, α2, β1, β2 of the narrow grooves 40, and the groove area ratio S1 between the main grooves 30 and the contact patch and the groove area ratio S2 between the grooves other than the main grooves 30 and the contact patch.

As shown in FIGS. 6A and 6B, it can be seen from the results of the evaluation tests using the pneumatic tires 1 that the pneumatic tires 1 according to Examples 1 to 8 provide improved dry steering stability and wear resistance while maintaining wet performance at least to the levels of the conventional pneumatic tire 1. In other words, the pneumatic tires 1 according to Examples 1 to 8 can provide improved steering stability and wear resistance without reducing wet performance.

The invention claimed is:

1. A pneumatic tire with a designated mounting direction with respect to a vehicle, the pneumatic tire comprising:
  a tread portion comprising
    a vehicle center main groove extending in a tire circumferential direction,
    a vehicle inner side main groove provided inward of the vehicle center main groove in a vehicle width direction,
    a vehicle outer side main groove provided outward of the vehicle center main groove in the vehicle width direction, and
    a plurality of land portions separated by the main grooves;
  the tread portion comprising
    a vehicle inner side center land portion disposed between the vehicle center main groove and the vehicle inner side main groove, a vehicle outer side center land portion disposed between the vehicle center main groove and the vehicle outer side main groove, a vehicle inner side shoulder land portion disposed inward of the vehicle inner side main groove in the vehicle width direction, and a vehicle outer side shoulder land portion disposed outward of the vehicle outer side main groove in the vehicle width direction; wherein the vehicle inner side center land portion and the vehicle outer side center land portion comprise narrow grooves, the narrow grooves being the only grooves formed in the vehicle inner side center land portion and the vehicle outer side center land portion;

the narrow grooves in the vehicle inner side center land portion comprise vehicle inner side center land portion narrow grooves that open to the vehicle center main groove at a first end, open to the vehicle inner side main groove at a second end, and bend in the tire circumferential direction;

the narrow grooves in the vehicle outer side center land portion comprise vehicle outer side center land portion outer narrow grooves that open to the vehicle outer side main groove at a first end and terminate within the vehicle outer side center land portion at a second end, and vehicle outer side center land portion inner narrow grooves that open to the vehicle center main groove at a first end and terminate within the vehicle outer side center land portion at a second end;

the vehicle outer side center land portion outer narrow grooves and the vehicle outer side center land portion inner narrow grooves are alternately disposed in the tire circumferential direction;

the vehicle inner side shoulder land portion comprises vehicle inner side shoulder land portion narrow grooves that open to the vehicle inner side main groove at a first end;

the vehicle inner side center land portion narrow grooves has a V-shape having a bent portion protruding in the tire circumferential direction;

a portion of the second end of the vehicle inner side center land portion narrow grooves and the vehicle inner side shoulder land portion narrow grooves incline in the same direction with respect to the tire circumferential direction; and the vehicle outer side center land portion inner narrow grooves and the vehicle outer side center land portion outer narrow grooves incline in mutually opposite directions with respect to the tire circumferential direction.

2. The pneumatic tire according to claim 1, wherein the vehicle outer side shoulder land portion comprises vehicle outer side shoulder land portion narrow grooves that open to the vehicle outer side main groove at a first end;

the vehicle outer side center land portion outer narrow grooves communicate with the vehicle outer side shoulder land portion narrow grooves via the vehicle outer side main groove; and the vehicle inner side center land portion narrow grooves communicate with the vehicle inner side shoulder land portion narrow grooves via the vehicle inner side main groove and communicate with the vehicle outer side center land portion inner narrow grooves via the vehicle center land portion.

3. The pneumatic tire according to claim 2, wherein the vehicle inner side shoulder land portion narrow grooves, the vehicle outer side center land portion inner narrow grooves, and the vehicle inner side center land portion narrow grooves satisfy a relationship $\alpha3=\alpha1+\alpha2$, where $\alpha1$ is an angle of the vehicle inner side shoulder land portion narrow grooves with respect to the tire circumferential direction, $\alpha2$ is an angle of the vehicle outer side center land portion inner narrow grooves with respect to the tire circumferential direction, and $\alpha3$ is a minor angle of a bend in the vehicle inner side center land portion narrow grooves.

4. The pneumatic tire according to claim 3, wherein the angle $\alpha1$ of the vehicle inner side shoulder land portion narrow grooves and the angle $\alpha2$ of the vehicle outer side center land portion inner narrow grooves are equal.

5. The pneumatic tire according to claim 3, wherein the vehicle inner side shoulder land portion narrow grooves are formed satisfying a range $50°≤\alpha1≤80°$; and the vehicle outer side center land portion inner narrow grooves are formed satisfying a range $50°≤\alpha2≤80°$.

6. The pneumatic tire according to claim 2, wherein $\beta1=\beta2$, where $\beta1$ is an angle of the vehicle outer side shoulder land portion narrow grooves with respect to the tire circumferential direction and $\beta2$ is an angle of the vehicle outer side center land portion outer narrow grooves with respect to the tire circumferential direction.

7. The pneumatic tire according to claim 6, wherein the vehicle outer side shoulder land portion narrow grooves and the vehicle outer side center land portion outer narrow grooves are formed satisfying a range $50°≤\beta1, \beta2≤80°$.

8. The pneumatic tire according to claim 1, wherein a groove area ratio S1 between the main grooves and a contact patch of the tread portion satisfies a range $15%≤S1≤20%$, and a groove area ratio S2 between grooves other than the main grooves and the contact patch satisfies a range $5%≤S2≤10%$.

9. The pneumatic tire according to claim 4, wherein the vehicle inner side shoulder land portion narrow grooves are formed satisfying a range $50°≤\alpha1≤80°$; and the vehicle outer side center land portion inner narrow grooves are formed satisfying a range $50°≤\alpha2≤80°$.

10. The pneumatic tire according to claim 9, wherein $\beta1=\beta2$, where $\beta1$ is an angle of the vehicle outer side shoulder land portion narrow grooves with respect to the tire circumferential direction and $\beta2$ is an angle of the vehicle outer side center land portion outer narrow grooves with respect to the tire circumferential direction.

11. The pneumatic tire according to claim 10, wherein the vehicle outer side shoulder land portion narrow grooves and the vehicle outer side center land portion outer narrow grooves are formed satisfying a range $50°≤\beta1, \beta2≤80°$.

12. The pneumatic tire according to claim 11, wherein a groove area ratio S1 between the main grooves and a contact patch of the tread portion satisfies a range $15%≤S1≤20%$, and a groove area ratio S2 between grooves other than the main grooves and the contact patch satisfies a range $5%≤S2≤10%$.

* * * * *